United States Patent
Doisy et al.

(10) Patent No.: US 10,459,610 B2
(45) Date of Patent: Oct. 29, 2019

(54) USER INTERFACE ADAPTATION METHOD AND ADAPTER

(71) Applicant: ORANGE, Paris (FR)

(72) Inventors: Nicolas Doisy, Rennes (FR); Jerome Chauvel, Trevou Treguignec (FR)

(73) Assignee: Orange, Paris (FR)

( * ) Notice: Subject to any disclaimer, the term of this patent is extended or adjusted under 35 U.S.C. 154(b) by 107 days.

(21) Appl. No.: 14/732,553

(22) Filed: Jun. 5, 2015

(65) Prior Publication Data

US 2015/0370436 A1   Dec. 24, 2015

(30) Foreign Application Priority Data

Jun. 19, 2014   (FR) ...................................... 14 55664

(51) Int. Cl.
  *G06F 3/0484*   (2013.01)
  *G06F 9/451*    (2018.01)
  *G06F 3/0481*   (2013.01)
  *G06K 9/00*     (2006.01)

(52) U.S. Cl.
  CPC .......... *G06F 3/0484* (2013.01); *G06F 3/0481* (2013.01); *G06F 9/451* (2018.02); *G06K 9/00228* (2013.01)

(58) Field of Classification Search
  CPC .................................................... G06F 3/0484
  USPC ......................................................... 715/762
  See application file for complete search history.

(56) References Cited

U.S. PATENT DOCUMENTS

| | | | | |
|---|---|---|---|---|
| 8,676,224 | B2* | 3/2014 | Louch | H04M 1/6041 455/456.1 |
| 8,875,034 | B2* | 10/2014 | Roulliere | G06Q 10/10 715/763 |
| 2009/0209293 | A1* | 8/2009 | Louch | H04M 1/6041 455/566 |
| 2010/0198730 | A1* | 8/2010 | Ahmed | G06F 17/30528 705/50 |

(Continued)

FOREIGN PATENT DOCUMENTS

WO   2007096556 A1   8/2007

OTHER PUBLICATIONS

P. Korpippa et al., "Managing context information in mobile devices", Pervasive Computing, Jul. 1, 2003, pp. 42-51.

(Continued)

*Primary Examiner* — William D Titcomb
(74) *Attorney, Agent, or Firm* — Haverstock & Owens LLP

(57) ABSTRACT

The invention relates to the adaptation of the user interface to an interaction context. An object of the invention is a method for adapting a user interface of at least one application implemented by a user terminal comprising a modification of at least one parameter of said user interface on said user terminal according to a change of context of interaction of the user with said user interface, one of said at least one modified parameters is an interaction parameter. Thus, the mode of interaction of the interface is also adapted to the interaction context. This means, in our example, that the user can switch automatically or manually from a "hands-on" mode to a "hands-off" mode enabling him or her, for example, to interact with his or her screen from several points of his or her kitchen without systematically going over to the latter.

17 Claims, 3 Drawing Sheets

(56) References Cited

U.S. PATENT DOCUMENTS

Figure 1:
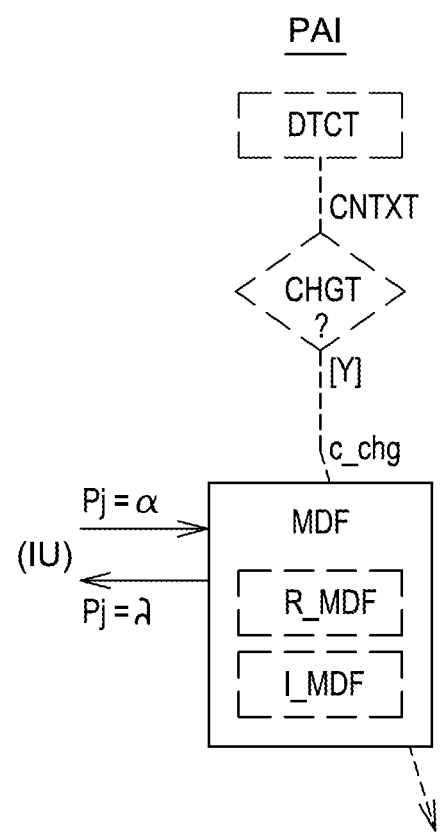

| | | | | |
|---|---|---|---|---|
| 2010/0331017 | A1* | 12/2010 | Ariga | G01S 5/0263 |
| | | | | 455/456.3 |
| 2012/0266079 | A1* | 10/2012 | Lee | G06F 17/30283 |
| | | | | 715/744 |
| 2013/0145024 | A1* | 6/2013 | Cao | H04L 67/22 |
| | | | | 709/224 |
| 2014/0026081 | A1* | 1/2014 | O'donnell | G06F 17/30699 |
| | | | | 715/760 |
| 2014/0143676 | A1* | 5/2014 | Tan | G06F 3/0484 |
| | | | | 715/744 |
| 2014/0184471 | A1* | 7/2014 | Martynov | G06F 3/1423 |
| | | | | 345/1.2 |
| 2014/0195953 | A1* | 7/2014 | Sakai | G06F 3/04883 |
| | | | | 715/771 |
| 2015/0185993 | A1* | 7/2015 | Wheatley | G06F 3/0484 |
| | | | | 715/744 |
| 2016/0054807 | A1* | 2/2016 | Flagg | G06F 3/017 |
| | | | | 345/158 |

OTHER PUBLICATIONS

Schmidt A: "Implicit human compute interaction through context", Personal Technologies, Springer, London GB vol. 4, No. 2-3, Jan. 1, 2000, pp. 191-199, XP002432574.

Tomohiro Mashita et al., "Human activity recognition for a content search system considering situations of smartphone users", 2012 IEEE Virtual Reality Mar. 1, 2012, pp. 1-2, XP055113491.

* cited by examiner

USER INTERFACE ADAPTATION METHOD AND ADAPTER

The invention relates to the adaptation of the user interface to an interaction context.

The designer of an application or of a website generally knows little about the user of his or her application and has no way of knowing it: will the user use the application seated at his or her desk with the application displayed on his or her screen or on public transport on his or her telephone or tablet? Perhaps the computer will read the application aloud! In effect, once online, the application is at the mercy of the user or, more particularly, of their terminals: of their font, of the screen color, of the form and the size of the window supporting the application. The designer, faced with all these uncertainties, with this flexibility, can choose to establish constraints.

The problem is then that, because of the wide range of terminals (computer monitors, smart phones, tablets, TV, etc.) that can be used to consult a given application, these constraints are set to defaults.

This is why the developers of applications and of websites have devised flexible interfaces that are flexible according to the context of use, namely the terminal used for access to it, also called responsive design. Thus, the experience of the application offered to the user is optimized according to the terminal with notably a same visual comfort and without having to use horizontal scrolling or the zoom in/out feature on the touch apparatuses in particular, operations which considerably detract from the user experience.

Nevertheless, the user of an application on a given terminal will be offered a single user interface which will possibly change only to the size and the form of the window supporting the application. Thus, a user of an application such as a cookbook on a tablet will be offered a single interface for this application on his or her tablet with a display for book-type reading and an interaction through the touch screen whether he or she is in the process of searching for a recipe with the tablet resting on his or her knees or on the table in front of him or her at a short distance away (approximately at arm's length), or whether he or she is in the process of searching for his or her ingredients and utensils in the cupboards or in the process of preparing his or her recipe (with hands possibly full of flour!).

The document "managing context information in mobile devices" by P. Korpipää et al., dated 1 Jul. 2003, Persuavive Computing, p. 42-51, proposes a management of the context information of the mobile devices. The aim is to take account of a context in an application, that is to say provide a service as a function of the location, of the moment, of the environment. In particular, the content and the format of the information reproduced are modified according to the context: environment, activity of the user.

One of the aims of the present invention is to remedy the inadequacies of the prior art.

One subject of the invention is a method for adapting a user interface of at least one application implemented by a user terminal comprising a modification of at least one parameter of said user interface on said user terminal according to a change of context of interaction of the user with said user interface, one of said at least one modified parameters is an interaction parameter.

Thus, the interface is also adapted to the interaction context. This means that, in our example, the user can switch automatically or manually from a "hands-on" mode to a "hands-off" mode enabling him or her, for example, to read his or her screen from several points of his or her kitchen without systematically going over to the latter.

And, thus, the user can switch from a control of the interface by the touch screen for example to a remote voice and/or gesture control (kinetic).

Advantageously, one of said at least one modified parameters is a reproduction parameter.

Thus, the size of the font can change according to the change of the interaction context and/or the color of the font or of the background and/or change from a reproduction by display to a reproduction by vocalization . . . to be adapted at least to the new interaction context.

Advantageously, said adaptation method comprises a detection of interaction context, said user interface parameter modification being triggered when the interaction context detected has changed.

Thus, the interface can be adapted automatically according to the interaction context detected.

Advantageously, according to one implementation of the invention, the various steps of the method according to the invention are implemented by software or a computer program, this software comprising software instructions intended to be executed by a data processor of a device forming part of a user terminal and being designed to control the execution of the various steps of this method.

The invention therefore also targets a program comprising program code instructions for the execution of the steps of the user interface adaptation establishment method when said program is executed by a processor.

This program can use any programming language and be in the form of source code, object code or intermediate code between source code and object code such as in a partially compiled form or in any other desirable form.

A subject of the invention is also a user interface adapter for at least one application implemented by a user terminal comprising a modifier of at least one parameter of said user interface on said user terminal according to a change of context of interaction of the user with said user interface, one of said at least one modified parameters is an interaction parameter.

A subject of the invention is also a user terminal comprising at least one processing device implementing an application a user interface of at least said processing device a user interface adapter according to the invention.

Advantageously, said terminal comprises at least one interaction context detector, said detector triggering said user interface parameter modifier when the interaction context detected has changed.

Advantageously, said user terminal according to the preceding claim characterized in that said detector comprises a detector of the face of the user of said terminal.

Thus, the interaction context is defined according to the distance of the user and/or the position of the user relative to his or her terminal.

Advantageously, said detector comprises at least one frame of reference, such as a gyroscope or an accelerometer placed in the detector or in an external device such as a bracelet worn by the user.

Thus, the interaction context is defined according to the frequency of interaction of the user with his or her terminal ("hands-on" and "hands-off" mode).

Figure 2A:
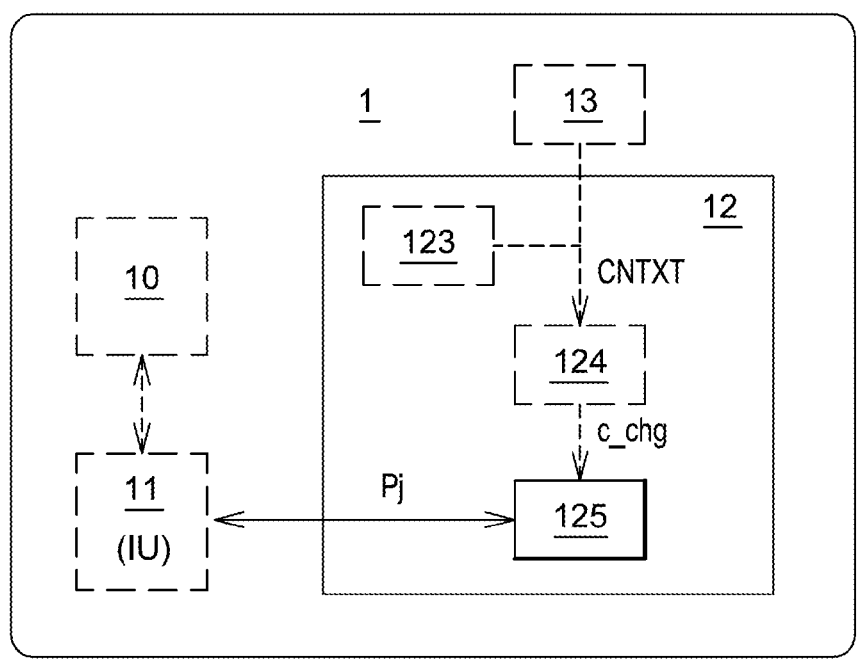
Figure 2B:
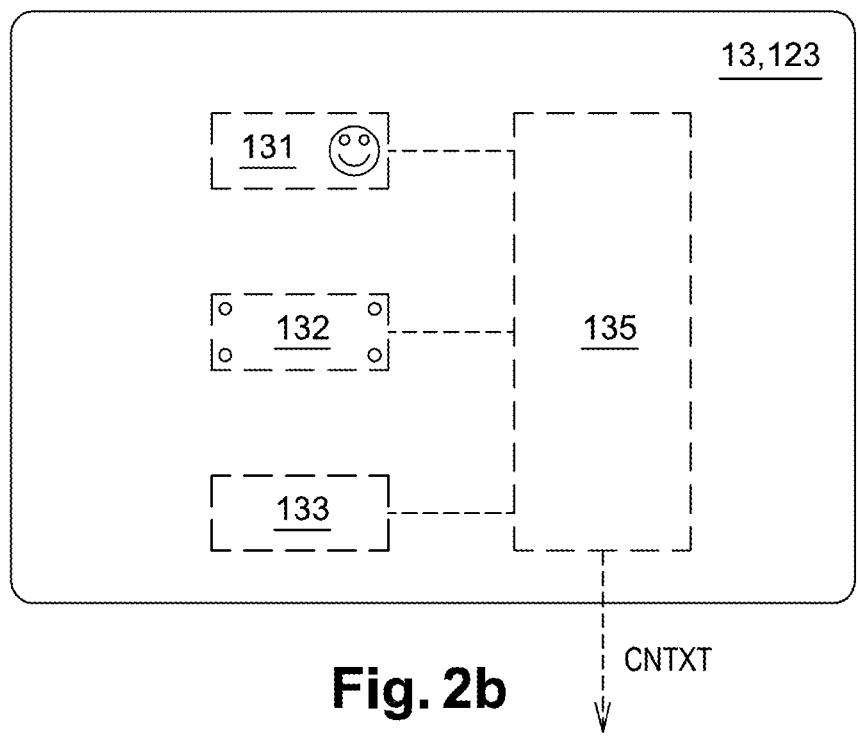
Figure 3A:
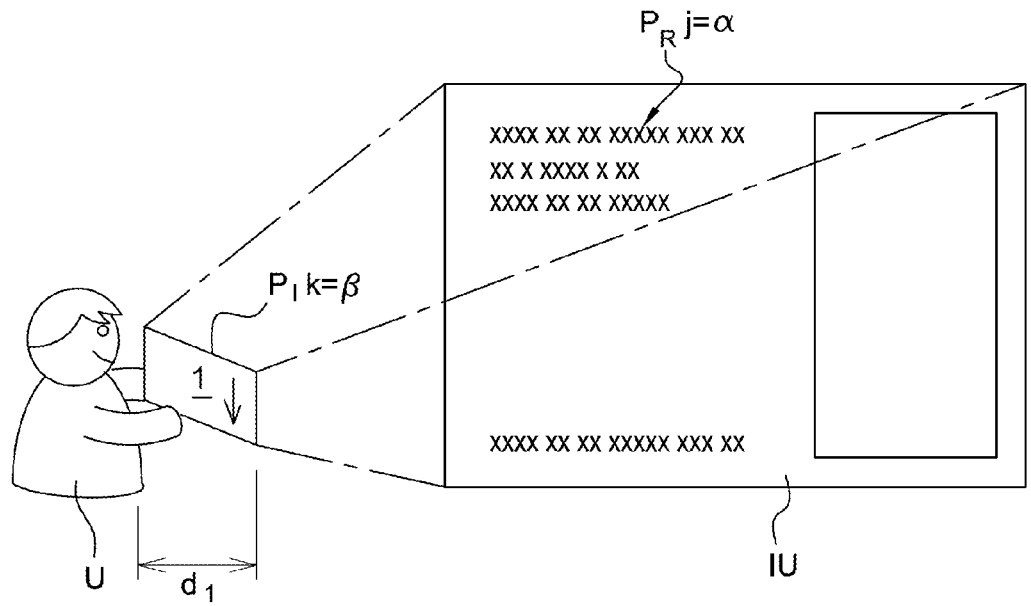
Figure 3B:
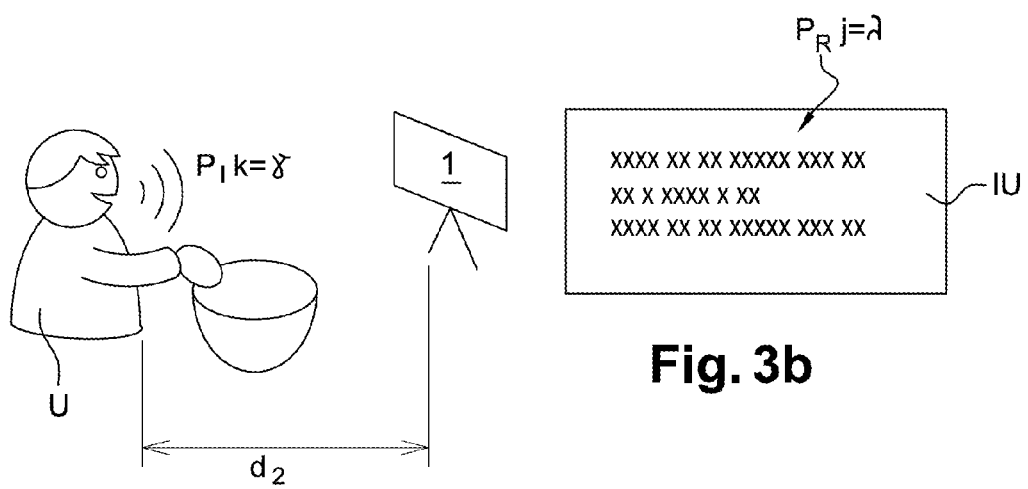

The features and advantages of the invention will become more clearly apparent on reading the description, given by way of example, and the figures relating thereto which represent:

FIG. 1, a simplified diagram of a user interface adaptation method according to the invention, FIGS. 2a and 2b, a simplified diagram of a user interface adapter according to the inventor and a simplified diagram of an interaction context detector used in a particular embodiment of the invention, FIGS. 3a and 3b, an example of use of the invention showing a user interface respectively in a first interaction context then in a second interaction context when the user interface adaptation method is implemented.

FIG. 1 illustrates a simplified diagram of a user interface adaptation method according to the invention.

The adaptation method PAI applied to a user interface of at least one application implemented by a user terminal comprises a modification MDF of at least one parameter Pj of said user interface IU on said user terminal according to a change c_chg of context of interaction of the user with said user interface. The interface IU is then adapted to the interaction context CNTXT.

In particular, the modification of a parameter MDF comprises a reading (not illustrated) of the current parameters Pj=α of the user interface of the application currently being used then a reading (not illustrated), instead of one or more parameters read, of the parameters modified Pj=λ according to the change of context c_chg.

In particular, one of said at least one modified parameters Pj is a reproduction parameter PRj. For example, the modification of parameters MDF comprises a reproduction parameter modification R_MDF which makes it possible to modify at least one reproduction parameter of the user interface according to the change in context c_chg.

In particular, one of said at least one modified parameters Pk is an interaction parameter PIk. For example, the modification of parameters MDF comprises an interaction parameter modification I_MDF which makes it possible to modify at least one user interface interaction parameter according to the change of context c_chg.

In particular, the adaptation method PAI comprises a detection of interaction context DTCT.

The user interface parameter modification MDF is, notably, triggered:
Either by the user by means of said user interface: the user interface IU then sends a modification command to the modification MDF. The command notably comprises information concerning the new interaction context.
Or by the detection of context directly which transmits the context CNTXT to the modification which takes it into account to possibly modify one or more parameters of the interface, or indirectly after verification of a change of context CHGT?: thus, the modification MDF is triggered only when the interaction context detected has changed CHGT?=[Y].

The modification MDF triggered by the user enables the user to adapt the interface to how he or she wants to use it.

The modification MDF triggered directly or indirectly by a detection of context DTCT makes it possible to automate the adaptation of the interface which facilitates the use of the application by the user in certain cases of use notably comprising repeated or systematic adaptations of the interface.

The modification MDF triggered in the case of a change of interaction context CHGT?=[Y] makes it possible to limit the use of the parameter modification, even of the reading of the parameters of the interface.

In a particular embodiment of the invention, the various steps of the method according to the invention are implemented by software or a computer program, this software comprising software instructions intended to be executed by a data processor of a device forming part of a user terminal and being designed to control the execution of the various steps of this method.

FIG. 2a illustrates a simplified diagram of a user interface adapter according to the inventor.

The user interface adapter 12 of at least one application implemented by a user terminal 1 comprises a modifier 125 of at least one parameter Pj of said user interface 11 (IU) on said user terminal 1 according to a change of context of interaction c_chg of the user with said user interface.

The user terminal 1 illustrated by FIG. 2a comprises
a processing device 10 implementing an application
a user interface 11 of at least said processing device 10
a user interface adapter 12 according to the invention.

In particular, the terminal 1 comprises at least one interaction context detector 13 or 123. At least one detector is present either directly in the terminal 1 (detector 13) and/or any device of the terminal 1 (not illustrated) and/or in the interface adapter 12 of the terminal 1 (detector 123). The detector 13, 123 directly or indirectly triggers the user interface parameter modifier 125.

In particular, the adapter 12 comprises a context change checker 124 connected to said detectors 13, 123. Thus, when the interaction context detected has changed, said checker 124 triggers the user interface parameter modifier 125 by supplying it with the new context c_nv (not illustrated) and/or the change of context c_chg.

FIG. 2b illustrates a simplified diagram of an interaction context detector used in a particular embodiment of the invention.

In particular, the detector 13, 123 comprises a detector 131 of the face of the user of said terminal.

In particular, said detector 13, 123 comprises at least one frame of reference, such as a gyroscope or an accelerometer (notably, the accelerometers present in the browser system or another device of the terminal 1, or one or more accelerometers placed in the detector or in an external device such as a bracelet worn by the user, etc.).

In particular, said detector 13, 123 comprises at least one other type of detector 133 (other than the face detector 131, accelerometer 132).

When said detector 13 comprises a number of types of detector supplying context information or receives (not illustrated) context information from several types of detector, the detector 13 comprises an analyzer suitable for determining, according to one or more context information items supplied, the current interaction context CNTXT.

FIGS. 3a and 3b illustrate an example of use of the invention showing a user interface respectively in a first interaction context then in a second interaction context when the user interface adaptation method is implemented.

Consider the example of an application concerning nutrition.

Initially, as shown in FIG. 3a, the user U searches, possibly, for a recipe on this application by means of his or her terminal 1. In this context the user U is at a reading distance d1 equal to an arm's length, even, when the terminal 1 is a touch tablet, the user U holds the terminal 1 in his or her hands.

The interface IU then presents, for example, an image of the dish and the list of the ingredients and the recipe, for example, in a font of a size suited to reading from a screen at a reading distance $d_1$ equivalent to close reading (that is to say at arm's length). The font size value α constitutes the value of the reproduction parameter PRj corresponding to the font pole size.

Furthermore, if the recipe requires more than one screen for its display, the user can read the continuation of the recipe by scrolling the recipe on his or her user interface IU by manual interaction directly or indirectly with his or her terminal 1 (touch scrolling for a touch tablet, scrolling by the use of "page up"/"page down" buttons of a virtual keyboard of the terminal 1 or of a physical keyboard connected to the terminal 1, scrolling by the manipulation of a scroll bar of the user interface IU either by touch or by means of a mouse connected to the terminal 1).

Thus, the user interface IU is adapted in reading and in interaction with the "hands-on" or "within reach" usage context.

Secondly, the user U goes on to prepare his or her dish. For this, he or she places his or her terminal 1 on a part of his or her work surface where the latter will not be soiled when he or she cooks. The drawback is that the user U, when cooking, will no longer be able to manipulate his or her terminal 1 and, furthermore, the current reproduction mode will require him or her to go repeatedly back and forth between his or her screen and his or her cooking apparatus to continue with the recipe.

The invention makes it possible either for the user to switch to a "hands-off" mode, or to detect the change of context for example by the distance of the user from his or her screen (decreasing face size for example), reduction of the manual interaction frequency, detection by a frame of reference of a stability of the terminal . . . . Thus, the adaptation method according to the invention will be able to modify one or more parameters of the user interface to be adapted to this new context.

The interface IU then switches, for example, to a reproduction of the recipe with a font of a size suited to reading from a screen at a reading distance $d_2$ equivalent to the average length of a work surface (for example). The font size value $\lambda$ constitutes the value of the reproduction parameter PRj corresponding to the font pole size.

Furthermore, if the recipe requires more than one screen for its display, the user can read the continuation of the recipe by scrolling the recipe on his or her user interface IU by a mode of interaction directly or indirectly with his or her terminal 1 other than the manual interaction mode: for example voice or gestural interaction, etc.

Thus, the user interface IU is adapted in reading and in interaction with the "hands-off" context of use.

As this example shows, the user can switch automatically or manually from a "hands-on" mode to a "hands-off" mode enabling him or her, for example, to read his or her screen from several points of his or her kitchen without systematically going over to the latter.

As our example shows, the font size can change according to the change of the interaction context and/or also the color of the font or of the background and/or also switch from a reproduction by display to a reproduction by vocalization . . . to be adapted at least to the new interaction context.

As FIG. 3b shows, the user can switch from a control of the interface by the touch screen for example to a voice command PIk=γ and/or remote gestural command (kinesic).

Thus, the interface can be adapted automatically according to the interaction context detected. The interaction context is, notably, defined according to the distance of the user and/or the position of the user relative to his or her terminal or according to the frequency of interaction of the user with his or her terminal ("hands-on" and "hands-off" mode).

In one embodiment of the invention, the adaptation method comprises a database of interaction rules in which an interaction context has associated with it an interaction mode comprising the values of one or more parameters of the user interface, and/or a processing making it possible to determine, according to the current values of the parameters of the user interface and/or context change values (change of distance, etc.), the values for the modification of one or more parameters of the user interface.

One or more rules may be common to all or some of the applications implemented by the terminal 1, or specific to one application. For example, the "hands-on mode" common to several applications comprises manual interaction parameters and reproduction parameters making it possible to read at arm's length. To take another example, a "recipe hands-off" mode for a nutrition application may be distinct from a "TV hands-off" mode for a VOD (Video On Demand) application. For example, the "recipe hands-off" mode comprises non-manual interaction parameters, whereas the "TV hands-off" mode comprises manual commands reducing the interaction commands to that of a remote control (change of channel, volume, contrast, and read/pause/stop commands. To return to a reading of the guide and to a video selection, the user must switch back to "hands-on" mode (detected for example by the position of the face relative to the terminal, facing the terminal "for hands-on" and alongside the terminal for "hands-off"). In the case of the VOD application, another mode, "viewing mode", can be envisaged for which the terminal 1 is placed at a distance from the user making it possible for one or more people to view the video. In this mode, the interaction and/or reproduction parameters are modified to take account of the fact that the user cannot interact manually, enabling interaction commands of remote control type by voice commands and/or the reproduction of an interface of remote control type on the screen of the terminal 1 for a gestural command for example.

The invention also targets a medium. The information medium can be any entity or device capable of storing the program. For example, the medium can comprise a storage means, such as a ROM, for example a CD ROM or a microelectronic circuit ROM or even a magnetic recording means, for example a diskette or a hard disk.

Also, the information medium can be a transmissible medium such as an electrical or optical signal which can be routed via an electrical or optical cable, by radio or by other means. The program according to the invention can in particular be downloaded over a network, notably of Internet type.

Alternatively, the information medium can be an integrated circuit in which the program is incorporated, the circuit being adapted to execute, or to be used in the execution of, the method concerned.

In another implementation, the invention is implemented by means of software and/or hardware components. In this respect, the term "module" may equally correspond to a software component or to a hardware component. A software component corresponds to one or more computer programs, one or more subprograms of a program, or, more generally, to any element of a program or of software suitable for implementing a function or a set of functions according to the description below. A hardware component corresponds to any element of a hardware assembly suitable for implementing a function or a set of functions.

The invention claimed is:

1. A method for adapting a user interface of at least one application implemented by a portable user terminal for a plurality of modes of interaction with the user based on one or more interaction mode parameters, the mode of interaction of the user with said user interface being defined by the position of the portable user terminal implementing said user interface relative to the user, comprising:

adapting said user interface on said portable user terminal for a first mode of interaction of the user with said user interface, utilizing one or more parameters comprising an interaction mode parameter; and adapting said user interface on said portable user terminal for a second mode of interaction of the user with said user interface when the position of the portable user terminal changes relative to the user from the first mode of interaction, by modifying the interaction mode parameter, wherein the interaction mode parameter comprises one or more user command types.

2. The method according to claim 1, characterized in that one of said one or more mode parameters is a reproduction parameter.

3. The method according to claim 2, further comprising detecting interaction mode, said interaction mode parameter modified when the interaction mode detected has changed.

4. The method according to claim 1, further comprising detecting an interaction mode, said interaction mode parameter modified when the interaction mode detected has changed.

5. The method according to claim 1, wherein the interaction mode parameter comprises an interaction type, wherein a first interaction type has a first number of interaction commands and a second interaction type has a second number of interaction commands, wherein the first number of interaction commands is different than the second number of interaction commands.

6. The method according to claim 1, wherein the interaction mode parameter in the first mode of interaction specifies a hands-on mode and the interaction mode parameter in the second mode of interaction specifies a hands-off mode.

7. The method according to claim 1, wherein the interaction mode parameter in the first mode of interaction specifies a first font size for display of characters within the user interface of the portable user terminal and the second mode of interaction specifies a second font size for display of the characters within the user interface of the portable user terminal.

8. The method according to claim 1, further comprising adapting said user interface on said portable user terminal for the first mode of interaction of the user with said user interface after the second mode of interaction, by modifying the interaction mode parameter.

9. A program comprising program code instructions for the execution of a method for adapting a user interface of at least one application implemented by a portable user terminal for a plurality of modes of interaction with the user based on one or more interaction mode parameters, the mode of interaction of the user with said user interface being defined by the position of the portable user terminal implementing said user interface relative to the user by establishing communication when said program is executed by a processor, the method comprising adapting said user interface on said portable user terminal for a first mode of interaction of the user with said user interface, utilizing one or more parameters comprising an interaction mode parameter, and for adapting said user interface on said portable user terminal for a second mode of interaction of the user with said user interface when the position of the portable user terminal changes relative to the user from the first mode of interaction, by modifying the interaction mode parameter, wherein the interaction mode parameter comprises one or more user command types.

10. The program according to claim 9, characterized in that one of said one or more parameters is a reproduction parameter.

11. The program according to claim 9, further comprising detecting interaction mode, said interaction mode parameter modified when the interaction mode detected has changed.

12. A portable user terminal comprising:

at least one processing device implementing an application;

a user interface of at least said processing device; and a user interface adapter comprising a modifier of said user interface on said portable user terminal for a first mode of interaction of the user with said user interface, utilizing one or more parameters comprising an interaction mode parameter, wherein said user interface on said portable user terminal is adapted for a second mode of interaction of the user with said user interface when the position of the portable user terminal changes relative to the user from the first mode of interaction, by modifying the interaction mode parameter, wherein the interaction mode parameter comprises one or more user command types.

13. The portable user terminal according to claim 12, characterized in that said terminal comprises at least one interaction mode detector, said detector triggering said interaction mode parameter modified when the interaction mode detected has changed.

14. The portable user terminal according to claim 13, characterized in that said at least one mode detector comprises a detector of the face of the user of said terminal.

15. The portable user terminal according to claim 14, characterized in that said at least one mode detector comprises at least one frame of reference.

16. The portable user terminal according to claim 13, characterized in that said at least one mode detector comprises at least one frame of reference.

17. A user interface adapter for at least one application implemented by a portable user terminal for a plurality of modes of interaction with the user based on one or more interaction mode parameters, the mode of interaction of the user with said user interface being defined by the position of the portable user terminal implementing said user interface relative to the user, comprising a modifier of said user interface on said portable user terminal for a first mode of interaction of the user with said user interface, utilizing one or more parameters comprising an interaction mode parameter, wherein said user interface on said portable user terminal is adapted for a second mode of interaction of the user with said user interface when the position of the portable user terminal changes relative to the user from the first mode of interaction, by modifying the interaction mode parameter, wherein the interaction mode parameter comprises one or more user command types.

* * * * *